CLEANER FOR ROTARY PRINTING OR DUPLICATING MACHINES

Original Filed May 10, 1955 5 Sheets-Sheet 1

INVENTORS
LESTER F. MITCHELL
and EDWARD J. JANKE
By Bates, Teare, & McBean
ATTORNEYS

CLEANER FOR ROTARY PRINTING OR DUPLICATING MACHINES

Original Filed May 10, 1955 5 Sheets-Sheet 2

INVENTORS
LESTER F. MITCHELL
and EDWARD J. JANKE
By Bates, Ciaire, & McBean
ATTORNEYS CLEANER FOR ROTARY PRINTING OR DUPLICATING MACHINES
Original Filed May 10, 1955 5 Sheets-Sheet 3
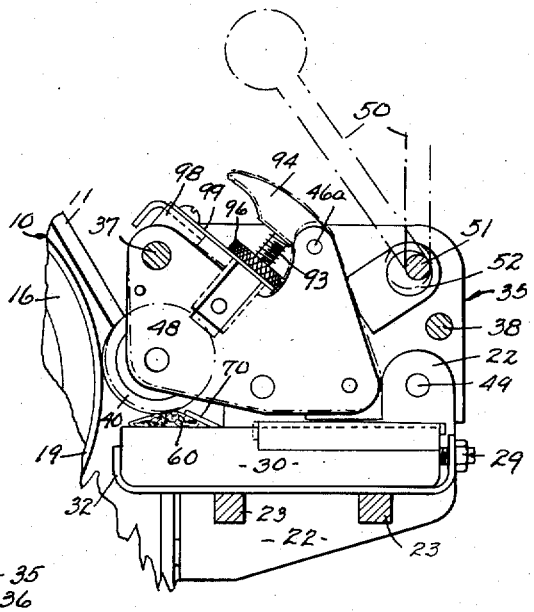
Fig.-3
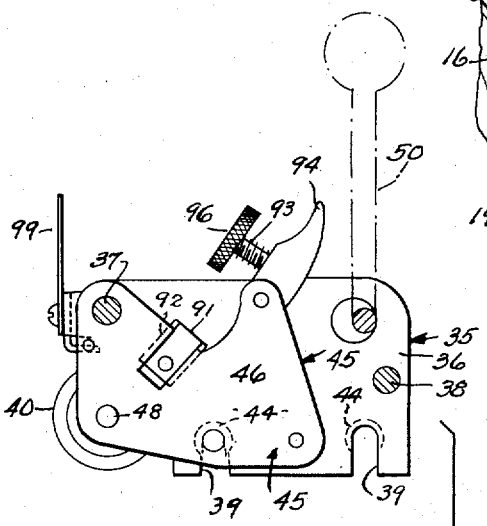
Fig.-4
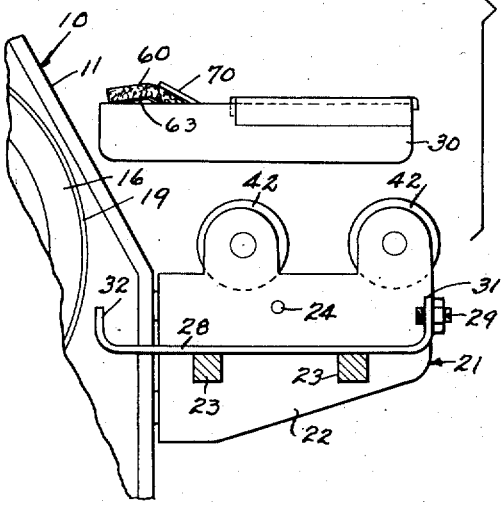
INVENTORS
LESTER F. MITCHELL
and EDWARD J. JANKE
By Bates, Greene, & McBean
ATTORNEYS

CLEANER FOR ROTARY PRINTING OR DUPLICATING MACHINES

Original Filed May 10, 1955 5 Sheets-Sheet 4

INVENTORS
LESTER F. MITCHELL
and EDWARD J. JANKE
By Bates, Teare, & McBean
ATTORNEYS

CLEANER FOR ROTARY PRINTING OR DUPLICATING MACHINES

Original Filed May 10, 1955 5 Sheets-Sheet 5

INVENTORS
LESTER F. MITCHELL
and EDWARD J. JANKE
By Bates, Teare & McBean
ATTORNEYS United States Patent Office Re. 24,739
Reissued Nov. 24, 1959

24,739

CLEANER FOR ROTARY PRINTING OR DUPLICATING MACHINES

Edward J. Janke, Cleveland, Ohio, and Lester F. Mitchell, deceased, late of Shaker Heights, Ohio, by National City Bank of Cleveland, executor, Cleveland, Ohio, assignors to Addressograph-Multigraph Corporation, Cleveland, Ohio, a corporation of Delaware Original No. 2,791,177, dated May 7, 1957, Serial No. 507,206, May 10, 1955. Application for reissue May 1, 1959, Serial No. 816,357

14 Claims. (Cl. 101—425)

Matter enclosed in heavy brackets [ ] appears in the original patent but forms no part of this reissue specification; matter printed in italics indicates the additions made by reissue.

This application is a continuation in part of our application Serial No. 486,478, filed February 7, 1955.

This invention is concerned with improvements in or relating to a device for cleaning inked surface of a roll or cylinder of a rotary printing or duplicating machine, and particularly for cleaning and removing ink from the offset or transfer surface of a rotary planographic or lithographic type duplicating machine. These therefore are the general objects of the present invention.

Many rotary printing or duplicating machines are being used in industrial and similar establishments to make a relatively small number of imprints from each of a series of master printing plates, for the production of orders, invoices, and various other business forms. For such purposes use is made of relatively thin flexible printing plates, often made of paper, having a preformed image thereon which may be completed by a typing operation through a special inked ribbon. These printing plates are removably mounted on the master drum or cylinder of the printing or duplicating machine; supplied with an ink repellent and ink in any well known manner; and the inked image transferred by rolling contact to an offset or transfer surface of a transfer drum. This ink image is then transferred to a work sheet which is passed between the transfer cylinder and a suitable impression drum or roller. When the desired number of imprints have been made from one printing plate, it is removed from the master cylinder, a new plate substituted therefor, and another set of imprints made. However, before imprints can be made from the second master printing plate, the offset or transfer surface of the duplicating machine must be cleaned to remove any traces of ink which were applied thereto by the previous printing plate. Heretofore, it has been the general practice for the operator to apply an ink solvent to the offset surface with a saturated sponge or rag, following which the operator wiped the surface with a "clean" cloth to complete the cleaning operation. Such methods of cleaning the offset surfaces have been slow and inefficient. Furthermore such methods are dangerous to the health and safety of the operator as the ink solvents generally are inflammable. After one cleaning operation had been accomplished, the cloth used for the final wiping was seldom if ever clean, indeed its condition was usually such that traces of ink remained on the offset surface. Accordingly, it has been the practice of most operators to pass several cleaning sheets through the machine to remove the traces of ink remaining on the offset surface after the "cleaning" operation had been completed. The cleaning sheets were discarded. Such operations have been time consuming and costly as the number of "cleaning" sheets used in many instances exceeded the number of sheets imprinted from the printing plates.

Mechanical cleaning devices have been proposed, tried, and found wanting. For the most part such devices have been complicated and the results have been slow, inefficient, and far from satisfactory. At the present time the cleaning generally is carried out by hand in the old dangerous and inefficient manner. Accordingly an object of the present invention is to provide a cleaning mechanism which will efficiently and economically clean the offset or transfer surfaces of the cylinders of lithographic or similar printing or duplicating machines. Further object of the present invention is the provision of a cleaning device which may be attached to existing machines without difficulty.

A further object of the present invention is to provide a cleaning device for removing ink from the offset or transfer surfaces of rotary duplicating machines which will be so constructed that the cleaning mechanism may be readily removed from the duplicating machine for periodic cleansing and replaced by relatively unskilled operators without altering the adjustments of the cleaning mechanism and which when replaced, will assume the same position relative to the surface to be cleaned that existed prior to its removal.

Other objects and advantages of this invention will become more apparent from the following description of [an embodiment] *embodiments* of the invention which [is] *are* illustrated in the accompanying drawings in which:

Fig. 3 is a vertical transverse section through the cleaner, the plane of the section being indicated by the lines 3—3 on Fig. 2;

Fig. 4 is a sectional view, similar to Fig. 3, but illustrating certain units of the cleaner separated from the base section thereof to facilitate cleansing of the cleaner itself;

Figure 2:
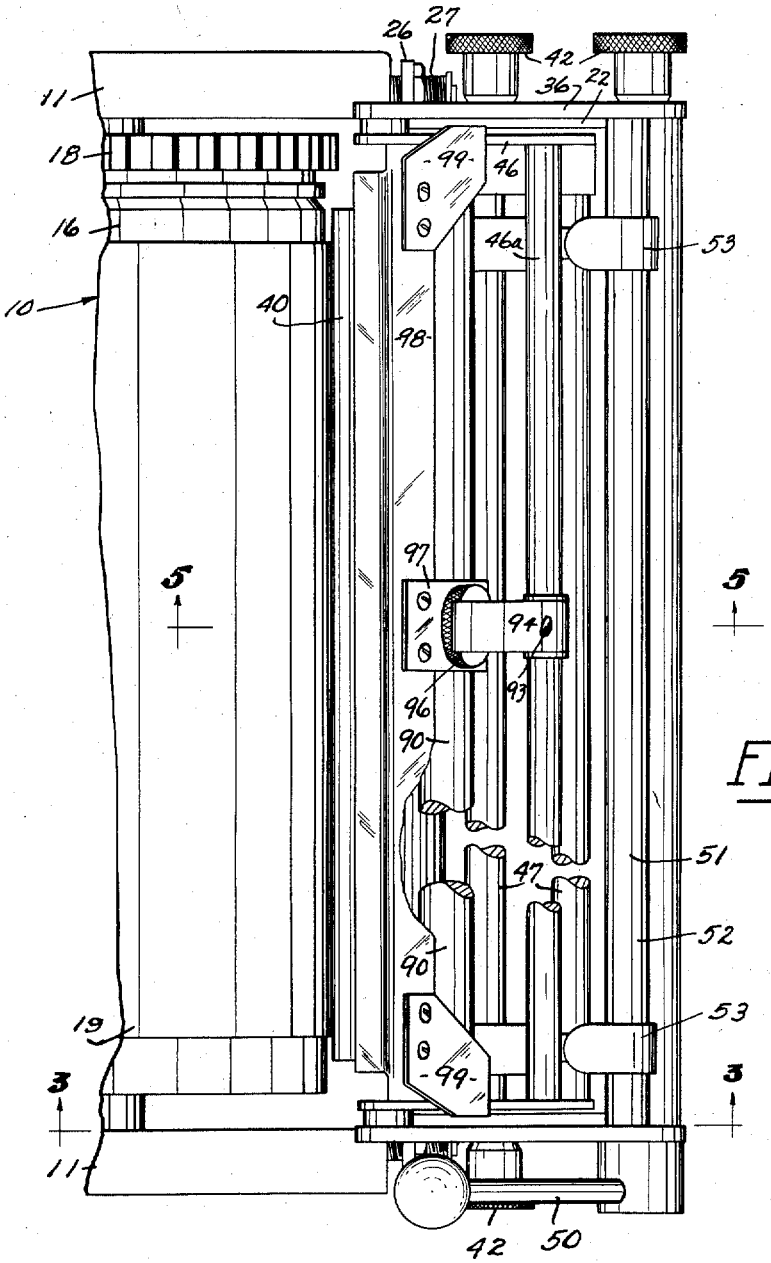
Fig. 2 is a plan view of the improved cleaner as attached to the printing or duplicating machine, the scale being somewhat larger than that of Fig. 1.

In the drawings an offset printing machine of the planographic or lithographic type, well adapted for use as an office duplicator, is generally indicated at 10 as including a pair of vertically extending side plates 11 spaced apart by suitable cross frame members, not shown. The printing machine includes a master cylinder 15, an offset or transfer cylinder 16, and an impression cylinder or roller 17, all of which are rotatably journaled between the frame plates 10 and are driven from a suitable source of power through gearing including the gear 18, which is shown in Fig. 2 as being secured to the offset cylinder 16. Suitable ink repellent and ink applicators, not shown, are provided to ink the image of a printing plate 12 (Fig. [2] *1*) encircling the master cylinder 15. The inked image is transferred by rolling contact from the printing plate 12 to the offset surface of the transfer cylinder 16 and from there to the work sheet in the usual manner.

Figure 8:
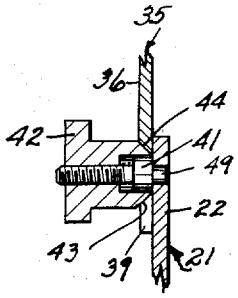
Fig. 8 is a sectional detail, the plane of which is indicated by the line 8—8 of Fig. 1.

This invention is not concerned with the particular details of the printing or duplicating machine, accordingly the brief description above given should be found sufficient. However, it may be pointed out that the transfer surface of such a machine is generally provided by relatively thin flexible blanket made of sheet rubber or other similar material. Such an offset or transfer blanket is indicated at 19 in Figs. 5, 6 and 8 of the drawings and is secured in position on the surface offset cylinder in any well known manner. The offset cylinder 16 generally is positioned so that the ink transfer surface of the transfer blanket is accessible for cleaning, either from the front or the rear of the machine. This is true in the machine illustrated.

The cleaning device, with which the present invention is particularly concerned, is generally indicated at 20 and comprises a [base] *main* frame unit 21 including a pair of end plates 22 spaced apart by suitable cross frame members such as the bars 23. The end plates 22 are each flanged outward to provide vertically extending flanges 26 (Figs. 1 and 6) which receive suitable [bolt] *bolts* 27 for readily attaching and aligning the cleaner to the frame plates 11 of the rotary printing or duplicating machine. The particular form of these flanges may be varied to suit various types or models of printing machines, or they may be identical for all machines. In the latter instance a suitable adaptor may be interposed between the flange 26 of the cleaner and the machine frame 11. The bars 23 of the frame unit 21 carry a pair of brackets 28 which removably support an elongated receptacle or pan 30 adapted to contain a supply of cleaning fluid such as an ink solvent. The pan 30 is restrained against lateral movement by a pair of adjustable set screws 24 (Figs. 1 and 4) carried by respective end plates 22. Similar set screws 29 (Fig. 5), carried by upturned ends 31 of the brackets 28, clamp the receptacle 30 against upturned ends 32 at the opposite ends of the brackets.

A [main] *second* frame unit 35 is removably mounted on the [base] *main* frame 21 and carries a cleaner roll 40. The [main] *second* frame 35 includes a pair of end plates 36 which are spaced apart by cross frame members, such as the rods 37 and 38. The [main] *second* frame plates 36 have slots 39 extending upwardly from their lower edges and which embrace respective pins 41, the inner ends 49 of which are secured to respective end plates 22 of the [base] *main* frame unit 21 and project outward therefrom. When the [main] *second* frame unit 35 is in position, the upper ends of the slots 39 rest on the pins 41 and the side plates 36 thereof lie outside the corresponding plates 22 of the [base] *main* frame unit 21.

Figure 1:
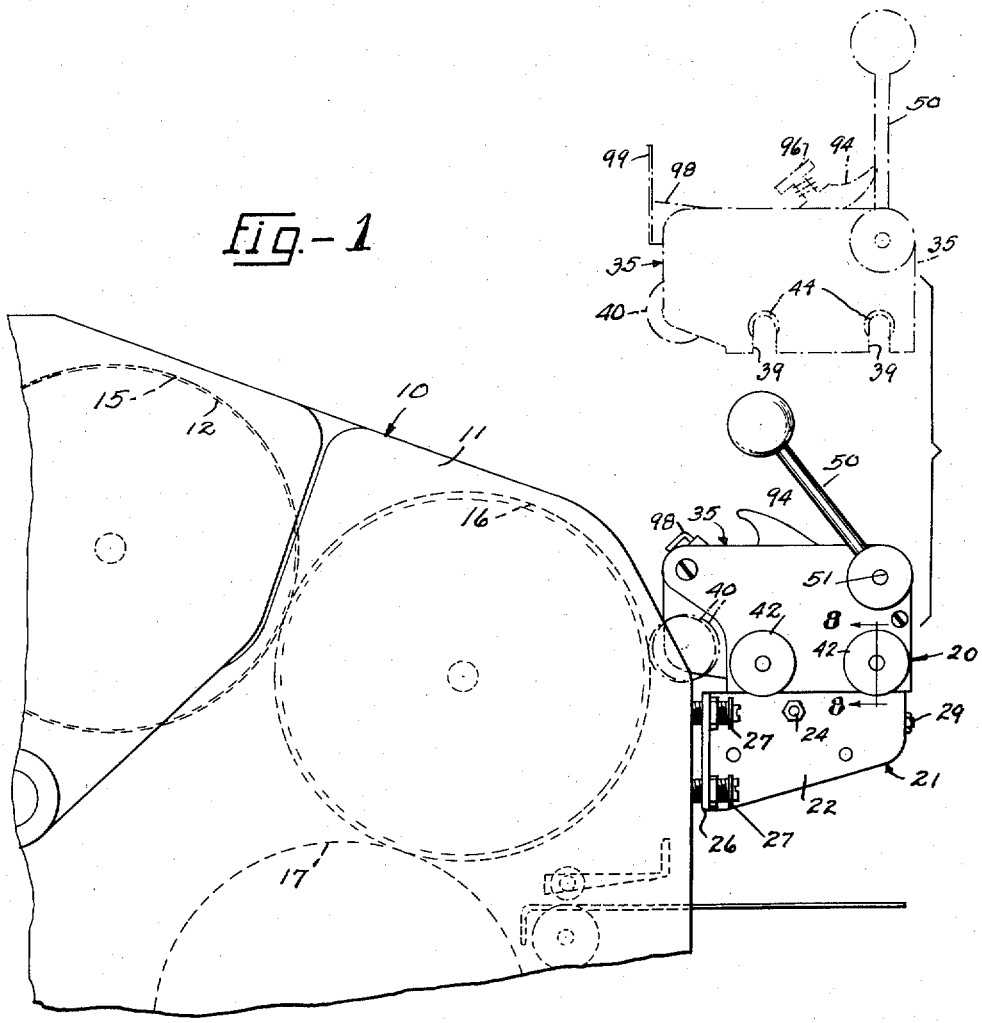
Fig. 1 is a side view of the improved cleaner attached to a rotary printing machine of the lithographic or planographic type, portions only of the printing machine being illustrated.

The [main] *second* frame unit 35 is removably retained in position on the [base] *main* frame unit 21 by knurled nuts 42 which threadingly coact with the pins 41. The inner end of each nut 42 is provided with a conical formation 43 which coacts with a mating conical surface 44 in the nature of a counter-sink formed in respective frame plates 22. Accordingly, the [main] *second* frame unit 35 may be readily removed by loosening the nuts 42 until their innermost conical ends 43 are free from the respective seats 44, following which the [main] *second* frame unit may be lifted free from the [base] *main* frame unit 21 as indicated in Figs. 1 and 3.

The cleaner roll 40 which removes ink from the surface of the transfer cylinder 16 is supported by the [main] *second* frame unit 35 for movement to and from the surface to be cleaned. As shown, the roll 40 is mounted in a supplemental frame 45 which includes a pair of end plates 46 spaced apart by suitable cross frame members such as rods 47 (Fig. 5), the ends of which are secured to respective plates 46. The supplemental frame 45 is pivotally mounted on the rod 37 of the [main] *second* frame unit, which rod passes through the upper ends of the supplemental frame plates 46. The cleaner roll 40 is mounted on a rod 48, the ends of which are secured to the supplemental frame plates 46. The rod 48 is parallel with and spaced below the pivot rod 37. When the cleaner is in position on a printing machine, it is so positioned that the rod 48 is parallel with the axis of the offset or transfer cylinder 16. The arrangement is such that the swinging of the supplemental frame 45 about the axis of the rod 37 moves the cleaner roll 40 into and out of rolling contact with the surface of the offset blanket 19 carried by the cylinder 16.

The supplemental frame 45 may be swung to move the roll 40 into or out of peripheral contact with the surface to be cleaned at the will of the operator by means of a manually operable lever or handle 50. As shown in Figs. 1 to 4 inclusive, the lever 50 is secured to the outer end of a rod 51, the ends of which are journaled in the frame plates 36 of the [main] *second* frame unit 35. The mid-portion 52 of the rod 50 is eccentric relatively to its end portions and is interconnected by a pair of extensible links 53 with one of the cross frame rods 47 of the supplemental frame unit 45. Any suitable means may be provided to limit either the throw of the lever 50 or the swinging movement of the supplemental frame 45, however, the arrangement preferably is such that as the cleaner roll 40 moves from one position to another the axis of the eccentric portion 52 of the rod 51 passes from one side to the other, of a plane passing through the axis of the pivoted portions of such rod and the axis of the frame rod 47 to which the other end of the links 53 are secured. The extensibility of the links 53 permits the adjustment of the contact pressure between the roll 40 and the surface of the transfer cylinder 16.

The cleaner roll 40, as heretofore mentioned, is mounted for rotation and axial movement on the rod 48. The roll 40 is provided with a surface formed of rubber or rubber-like material and is of a hardness of from thirty to sixty as measured by a Shore A Durometer and preferably from three to six tenths that of hardness of the offset blanket with which it is used. It has been found that the hardness of this surface is critical to enable this roll to be both frictionally driven by the offset surface of the transfer roll 16 and effectively remove ink therefrom. The roll 40 is journaled on the rod 48, and is moved axially thereof consequent upon its rotation. For this purpose one end of the roll 40 is provided with a bushing 56 having an annular cam slot 57 which is engaged by a pin 58 mounted in a relatively fixed position in a block 59 secured to the adjacent end plates 46 of the supplemental frame 45.

Ink remaining on the offset blanket 16 is softened by a film of ink solvent carried by the cleaner roll and is transferred to the cleaner roll 40 as the latter is driven by its frictional contact with such blanket. Such ink is removed from the roll 40 by a solvent charged wiper 60. This wiper, as shown in the drawings, comprises an elongated strip of absorbent material, such as felt, fabric, molleton, or the like which is saturated with liquid ink solvent. In the embodiment shown in Figs. 1 to 8 inclusive, the wiper 60 is illustrated as comprising an elongated strip of felt one longitudinal edge of which is removably positioned in a longitudinally extending forward facing channel 61 formed by an elongated Z shaped plate 62 one leg of which is secured, as by welds (not shown), to the bottom wall of the solvent container 30 some distance back of the cleaner roll 40. A wiper supporting member 63 comprising a plate made of thin spring metal also extends into and is supported by the channel 61. This plate inclines forward and upward as at 64 toward the roll 40, and then forward and downward as at 65 toward the forward edge 66 of the receptacle 30. The wiper 60 lies atop the spring-like supporting member. The portion 67 of the wiper overlying the portion 65 of the supporting member 63 is resiliently pressed into engagement with the lower surface of the cleaner roll 40 by the supporting member 60.

The wiper is retained in its wiping position relative to the cleaner roll 40 by a rigid retainer member 70. This retainer member comprises an elongated plate having its ends bent downward forming flanges 71 which are secured to the ends of the receptacle 30 as, for instance, by welding. The retainer member 70 lies in a plane substantially parallel with the inclined surface 64 of the supporting member 63 and spaced thereabove a distance substantially one and a half times the thickness of the wiper 60. The forward edge of the retainer terminates in a line adjacent to the periphery of the cleaner roll 40 but spaced therefrom a [distince] *distance* to permit the desired movement of the roll 40 to and from the surface of the cylinder 16. The arrangement is such that the inclined portion 75 of the wiper has its lower longitudinal end submerged in the ink solvent carried by the receptacle 30. Further, it will be noted that the capillary action of such inclined portion 75 is unobstructed as it lies substantially free between the retainer 70 and the support 63. The rotation of the cleaner roll, which is in the direction of the arrow of Fig. 5, has a tendency to cause the ink or solvent laden ink removed from the offset surface by the roll 40 to pass onto the forward side 76 of the wiper, namely, toward the left in Fig. 5. It will be noted that this portion 76 of the wiper is positioned above the forward portion of the pan or receptacle 30 which is partially separated from the main or rear portion of the receptacle by the wiper supporting spring 63. As there is substantially no agitation of the cleaning fluid this division of the receptacle causes ink and other materials removed from the roll 40 by the wiper to remain, for the most part, in the forward portion 76 of the receptacle. This enables the use of the cleaner for relatively long periods of time without changing the cleaning solution.

Figure 11:
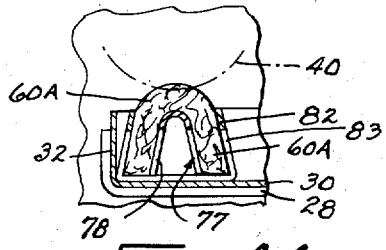
Fig. 11 is a sectional detail, the plane of which is indicated by the line 11—11 of Fig. 10.
Figure 10:
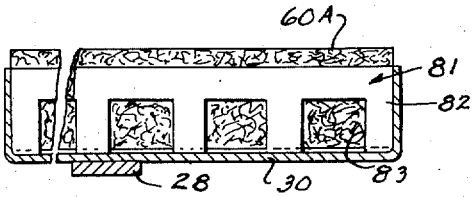
Fig. 10 is a fragmentary sectional view illustrating a further modification.

In the embodiment shown in Figs. 10 to 11 inclusive the wiper 60A in cross section is shaped like an inverted U and its mid-portion is held in wiping contact with the cleaner roll 40.

The wiper 60A is removably mounted in a channel-like retainer or trough 81, the upwardly extending sides 82 of which converge toward each other to form a support which retains the wiper in position against the roll 40. The retainer 81 is positioned in the pan 30 and is provided with suitable openings 83 which permit direct contact between the wiper 60A and the supply of liquid ink solvent retained in the pan 30. The wiper 60A is positioned with its lower portion submerged in such solvent, and its upper portion extending thereabove and contacting the bottom surface of the roll 40. Due to capillary attraction the ink solvent rises in the wiper and saturates it throughout.

Figure 5:
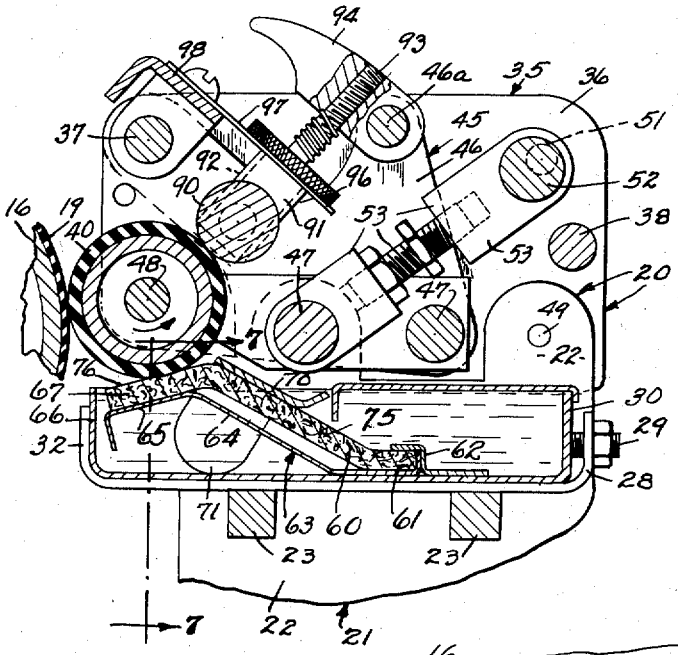
Fig. 5 is a vertical transverse section of the cleaner on a scale larger than that of either Figs. 2 to 4, the plane of the section being indicated by the lines 5—5 of Fig. 2.
Figure 6:
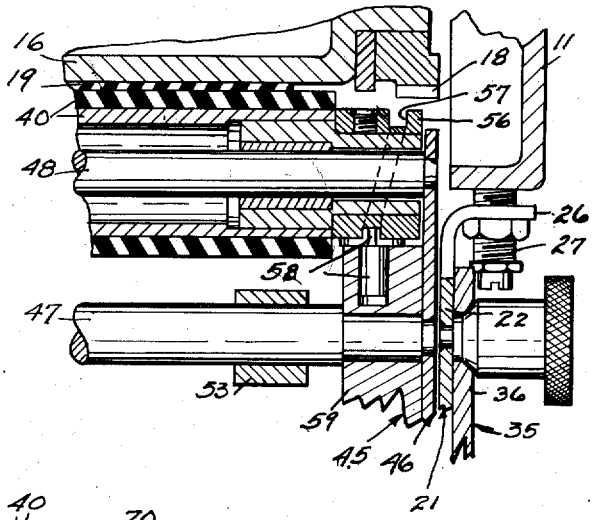
Figs. 6 and 7 are sectional details, the planes of which are indicated by the correspondingly numbered lines of Fig. 5.
Figure 7:
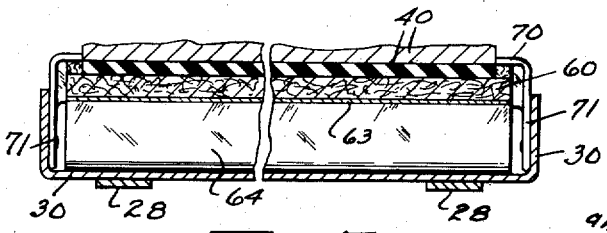
Figure 9:
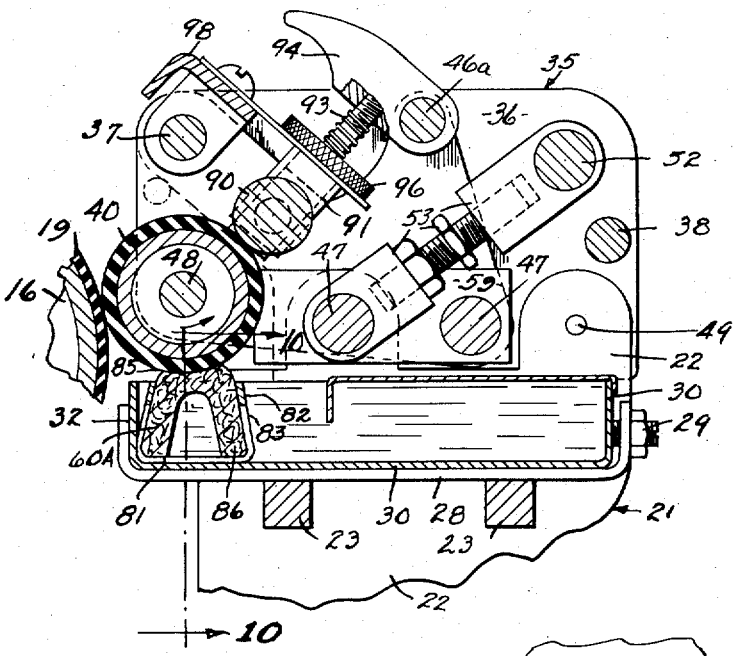
Fig. 9 is a sectional view similar to Fig. 5 but illustrating a modified form of cleaner.

In the embodiment shown in Figs. 9 to 11 it has been noted that as the roll 40 is rotated in the direction of the arrow of Fig. 5, much of the ink charged solvent at the leading area of contact 85 between the wiper 60A and the roll 40 appears to be removed in a manner similar to that of a squeegee and appears to gravitate or flow to the pan 30, while the comparatively ink free solvent in the pan rises more rapidly in the trailing edge and leg 86 of the wiper than when the roll 40 is stationary. This is [believe] *believed* to create a flow of solvent in the [pan which rises more rapidly in the trailing edge and leg 86 of the wiper than when the roll 40 is stationary. This flow of solvent in the] wiper *which* prevents an excessive accumulation of ink therein and greatly lengthens its life.

In the modification of Fig. 11 an elongated resilient support 77 is provided to retain the wiper 60A in contact with the surface of the superposed cleaner roll 40. This support comprises an elongated strip of thin spring metal having openings 78 to admit solvent to the wiper. The use of such a support permits the use of a felt-like material of less body than that required when the wiper is unsupported and becomes advantageous where it is desired to increase the amount of solvent presented to the cleaner roll 40.

The amount of solvent remaining on the surface of roll 40 after it passes the wiper 60 or the wiper 60A is controlled by a roll 90. This roll has a metal surface and its ends are journaled in respective bearing boxes 91 which are slidably mounted for movement to and from the axis of the roll 40 in respective guideways 92, formed by the end plates 46 of the supplemental frame 45. The roll 90 is pressed against the roll 40 by an adjustable tensioning screw 93 carried by a lever 94 pivoted as at 95 to a cross frame member 46a of the supplemental frame 45. The screw 93 is threadingly mounted in the lever 94 and is provided with an enlarged head 96 to seat on a flat spring 97 carried by a bracket 98 which is pivoted on the frame rod 37. A similar flat spring 99 is mounted on each end of this bracket to coact with respective bearing blocks 91 and urge the latter toward the axis of the roll 40. The engagement of the spring 97 with the enlarged head 96 of the adjusting screw 93, the axis of which is offset from the axis of the pivotal connection between the lever 94 and the rod 46a, is such that the tension on the parts reacts to retain the lever 94 in its active position shown in Fig. 5, but at the same time [permit] *permits* the lever 94 to be readily swung by the operator to the idle position shown in Fig. 4. When the lever 94 is in its idle position the bracket 98 may be swung counterclockwise to its idle position. The roll 90 will then be free from tension and may be removed to permit access to the roll 40.

From the foregoing it will be seen that the present invention provides a highly efficient device for cleaning the offset or transfer surfaces of printing machines. The device is so arranged and constructed that it may be readily cleansed. Further the improved cleaner permits the application of *a* film of liquid ink solvent to the surface to be cleaned which film may be so controlled that for practical purposes it leaves no liquid solvent on the surface being cleaned, but at the same time provides such surface with sufficient solvent to soften any ink which may have become partially dried so that such ink may be removed from the offset surface without either scraping or rubbing such surface. Further the improved device is so arranged and constructed that the solvent does not accumulate on the various parts and surfaces of the printing machine, thus overcoming a disadvantage which, in the past, has been a serious defect in such cleaning devices as have been proposed.

We claim:

1. In a device for cleaning ink from a cylinder of a printing machine, a main frame adapted to be secured to a printing machine frame, a supplemental frame removably mounted on said main frame, a rotatable cleaning roll having a non-absorptive rubber surface rotatably mounted in said supplemental frame and bodily swingable to and from rolling contact with the surface of a cylinder to be cleaned, a receptacle for cleaning fluid removably mounted in said main frame below said roll, an absorbent member carried by said receptacle and having one portion thereof extending into fluid carried by the receptacle and another portion thereof extending upward out of such fluid and contacting said roll to transfer cleaning fluid thereto, a hard surfaced roller mounted in said supplemental frame above said receptacle and movable to and from rolling contact with said roll, resilient means urging said roller into contact with said roll to regulate the fluid on the roller, and manually operable means to swing the cleaning roller a predetermined distance into and out of rolling contact with the surface to be cleaned.

2. A cleaning device according to claim 1, wherein said resilient means is pivoted to said *supplemental* frame and is movable about its pivot into and out of engagement with opposite ends of said roller, an arm pivotally mounted on said *supplemental* frame, a member adjustably mounted on said arm, and adapted to engage and tension said resilient means against said roller, said arm being movable to swing said last-named member into and out of active position without changing the relation of said member relative thereto.

3. A cleaning device according to claim 1, wherein said absorbent member extends entirely across said receptacle and divides it into two compartments each adapted to contain cleaning fluid and between which free flow of fluid is prevented by said member, whereby ink laden fluid removed from the roll by the absorbent member will flow to one compartment and be substantially retained by said member, thereby preventing excessive contamination of the fluid in the other compartment which is applied by said member to said roll.

4. In a device for cleaning ink from the cylindrical surface of a rotary printing machine, having a frame, a main frame adapted to be secured to a printing machine frame, an open topped receptacle for a supply of liquid ink solvent removably mounted in said main frame, a second frame mounted on said first named frame and having cross frame members extending transversely above said receptacle, a manually releasable connection between said frames, a supplemental frame pivotally mounted in said second frame, a cleaning roller rotatably mounted in said supplemental frame with its axis parallel with the surface to be cleaned, manually controlled means interconnecting said second and supplemental frames to swing the supplemental frame and cleaning roller as a unit to and from the surface to be cleaned, said supplemental frame having a pair of open-ended guideways extending from the exterior thereof toward said roller, a hard-surfaced roll removably mounted in said guideways and movable therein to and from the surface of said roller, resilient means to move said roll toward said roller, and absorbent means removably mounted in said receptacle to transfer solvent to said roller, and wherein the second and supplemental frames may be removed as a unit from the first named frame to expose and permit access to said receptacle and to said absorbent member.

5. In a device for cleaning ink from the cylindrical surface of a rotary printing machine, a main frame adapted to be secured to a printing machine, a receptacle for liquid ink solvent removably mounted in said frame, an elongated liquid absorbent member carried by said receptacle having a portion thereof projecting above the receptacle and another portion thereof extending into the receptacle and adapted to be submerged in the fluid therein, a second frame mounted on said first named frame and having cross frame members extending transversely above said receptacle, a releasable connection between said frames, a supplemental frame pivotally mounted in said second frame, a cleaning roller rotatably mounted in said supplemental frame with its axis parallel with said absorbent member and with the surface to be cleaned, manually operable means to move the supplemental frame and cleaning roller as a unit to and from contact with the surface to be cleaned, a hard-surfaced roll removably mounted in said supplemental frame and movable therein to and from the surface of said roller, resilient means carried by said supplemental frame and coacting with said roll, means to resiliently urge said resilient means into contact with said roller, said last-named means including an adjustable member carried by said supplemental frame and bodily movable into and out of an active position to permit removal and restoration of said roll without altering the adjustment of said member.

6. In a device for cleaning ink from the cylindrical surface of a rotary printing machine, a main frame adapted to be secured to a printing machine, a receptacle for liquid ink solvent removably mounted in said frame, an elongated liquid absorbent member carried by said receptacle having a portion thereof projecting above the receptacle and another portion thereof extending into the receptacle and adapted to be submerged in the fluid therein, a second frame mounted on said first named frame and having cross frame members extending transversely above said receptacle, a releasable connection between said frames, a supplemental frame pivotally mounted in said second frame, a cleaning roller rotatably mounted in said second frame, a shaft journalled in said second frame, means interconnecting said shaft and said supplemental frame to move the supplemental frame and cleaning roller into and out of rolling contact with the surface to be cleaned, an operating handle carried by said shaft, said supplemental frame having a pair of open-ended guideways extending from the exterior thereof toward said roller, a hard surfaced roll having its ends rotatably mounted in said guideways and movable therein to and from the surface of said roller, an elongated plate formed of spring metal pivotally mounted on said supplemental frame and engaging the ends of said roll, adjustable means releasably engaging said plate intermediate its ends to tension the plate to resiliently urge it into contact with said roller, said last-named means being releasable to permit withdrawal of said roll without changing the adjustment of said adjustable means.

7. A cleaning device for cleaning ink from a cylinder of a printing machine, including a frame adapted to be attached to the printing machine, an elongated cleaning roll rotatably mounted in said frame with its axis parallel with the axis of the cylinder and movable bodily into and out of frictional rolling contact with the surface of the cylinder to be clearned, manually operable means to control the last named movement of said roll, a receptacle for cleaning fluid mounted in said frame beneath said roll, an elongated absorbent member mounted in said receptacle, a resilient support mounted in said receptacle to support said member and urge it upward into wiping contact with said roll, said support and member coacting to divide the receptacle into two longitudinally extending fluid compartments between which free flow of the cleaning fluid is prevented, one end of said member extending from contact with said roll into one compartment and the other end of said member extending from such contact toward the other compartment, whereby, when the coacting cylinder and roll are rotated to move the roll surface from the last mentioned end of the member toward the first mentioned end of the latter end will supply the roll with substatnially uncontaminated fluid from one compartment of said receptacle for transmission to the surface of the cylinder to be cleaned and ink laden solvent will be removed from said roll by the first mentioned end of said member and will pass into the other compartment of said receptacle.

8. A cleaning device according to claim 7, wherein said support comprises a thin spring metal plate which inclines upwardly and forwardly from the bottom of the receptacle toward said roll and then forwardly and downwardly into the receptacle.

9. A cleaning device according to claim 8 having means to reciprocate said roll axially relative to said member consequent upon rotation of said roll to increase the wiping action between the roll and absorbent member.

*10. In a device for cleaning ink from a cylinder of a printing machine, a frame adapted to be secured to a printing machine, a rotatable cleaning roll having a non-absorptive rubber surface mounted in said frame for swinging movement to and from rolling contact with the surface of a cylinder to be cleaned, a receptacle for cleaning fluid mounted in said frame below said roll, an absorbent member carried by said receptacle and having one portion thereof extending into fluid carried by the receptacle and another portion thereof extending upward out of such fluid and contacting said roll to transfer cleaning fluid thereto, a hard surfaced roller mounted in said frame above said receptacle and movable to and from rolling contact with said roll, resilient means urg-*

*ing said roller into contact with said roll to regulate the fluid on the roller, and manually operable means to swing the cleaning roller into and out of rolling contact with the surface to be cleaned.*

*11. In a device for cleaning ink from the periphery of a printing machine cylinder, a frame adapted to be secured to the printing machine, a rotatable roller having a non-absorptive surface mounted in said frame for movement to and from the surface to be cleaned, a receptacle for cleaning fluid mounted in said frame below said roller, a fluid absorbent transfer member mounted in said frame beneath said roller and adapted to transfer fluid from said receptacle to said roller, said member comprising an elongated strip of fluid absorbent material, means to support said strip with its longitudinal mid-portion in wiping contact with said roller and out of the fluid in said receptacle and with both of its longitudinally extending edges projecting downward into the fluid in the receptacle and spaced from each other.*

*12. A cleaning device according to claim 11, wherein the supporting means for said absorbent strip comprises an inverted channel shaped member made of non-fluid absorbent material, said member having a base adapted to rest in said receptacle and a pair of spaced upwardly extending longitudinal flanges converging toward each other and adapted to embrace the depending longitudinal edges of said absorbent strip, and wherein said flanges are perforated to permit fluid in the receptacle to contact said absorbent member.*

*13. A cleaning device according to claim 11, wherein said absorbent member extends entirely across said receptacle and projects to the bottom thereof, thereby dividing the receptacle into two compartments.*

*14. A cleaning device according to claim 10, wherein said resilient means is pivoted to said frame and is movable about its pivot into and out of engagement with opposite ends of said roller, an arm pivotally mounted on said frame, a member adjustably mounted on said arm, and adapted to engage and tension said resilient means against said roller, said arm being movable to swing said last-named member into and out of active position without changing the relation of said member relative thereto.*

References Cited in the file of this patent or the original patent

UNITED STATES PATENTS

| | | |
|---|---|---|
| 2,302,490 | Curtis | Nov. 17, 1942 |
| 2,465,160 | Levenhagen | Mar. 23, 1949 |
| 2,525,982 | Wescott | Oct. 17, 1950 |
| 2,584,380 | Delaplane | Feb. 5, 1952 |
| 2,704,029 | George | Mar. 15, 1955 |
| 2,731,916 | Koch | Jan. 24, 1956 |
| 2,832,290 | Mitchell et al. | Apr. 29, 1958 |